W. L. THOMAS.
VEHICLE FOR COTTON PICKERS.
APPLICATION FILED OCT. 4, 1912.
1,089,603.
Patented Mar. 10, 1914.
2 SHEETS—SHEET 1.
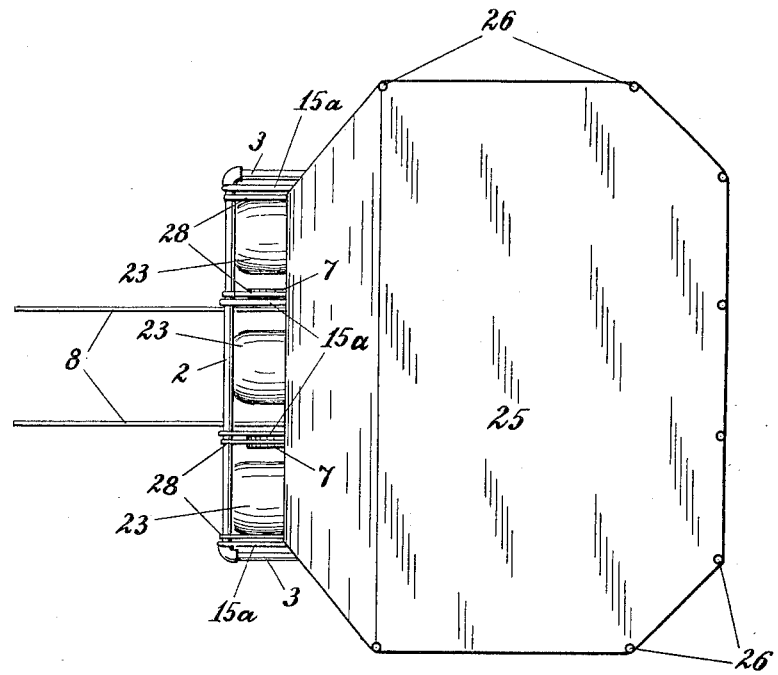
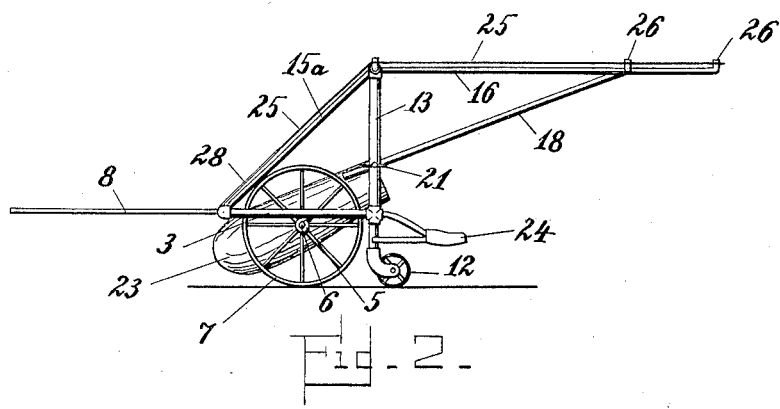
WITNESSES:
W. T. Damon
Wm. Bruckner
INVENTOR
William L. Thomas.
BY John M. Spellman.
ATTORNEY

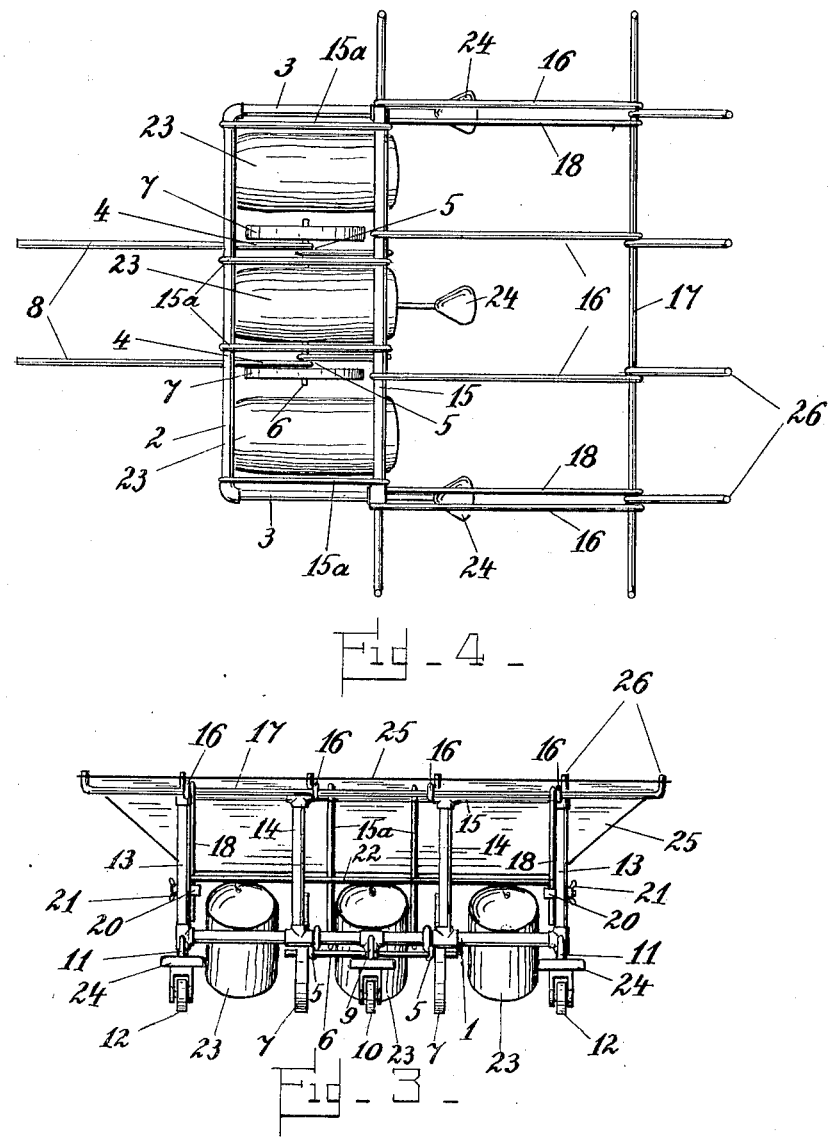

UNITED STATES PATENT OFFICE.

WILLIAM L. THOMAS, OF HUTCHINS, TEXAS.

VEHICLE FOR COTTON-PICKERS.

1,089,603.  Specification of Letters Patent.  Patented Mar. 10, 1914.

Application filed October 4, 1912. Serial No. 723,829.

*To all whom it may concern:*

Be it known that I, WILLIAM L. THOMAS, a citizen of the United States, residing at Hutchins, in the county of Dallas and State of Texas, have invented certain new and useful Improvements in Vehicles for Cotton-Pickers, of which the following is a specification.

My invention relates to a cotton picker's vehicle.

A principal object of my invention is to provide a vehicle of this class equipped with an awning for the purpose of providing shade for a number of cotton pickers operating along parallel rows of cotton.

A further object of my invention is to equip the vehicle with seats for the pickers and to provide thereon supports for a number of cotton sacks.

A further object of my invention is to provide means for adjusting the position of the awning to accord with the position of the sun.

Finally, the object of my invention is to provide a vehicle of the class described of simple and efficient construction, the parts of which are durable and not likely to get out of working order.

In the accompanying drawings I have illustrated a preferred embodiment of my invention, in which:

Figure 1 is a top plan view of the complete vehicle; Fig. 2 is a side elevation thereof; Fig. 3 is a rear end elevation thereof; and Fig. 4 is a top plan view of the frame of the vehicle with the awning removed.

Referring more particularly to the drawings, reference character 1 designates the rear longitudinal beam of a rectangularly-shaped supporting frame. The other sides of this frame are made up of the front longitudinal beam 2 and the cross-bars 3. Cross-bars 4 are disposed parallel to each other and to the cross-bars 3 within the rectangular frame 1, 2, 3 and the cross-bars 4 are provided with loops 5 forming recesses which receive the ends of an axle 6. Rotatably mounted on the axle 6 is a pair of vehicle wheels 7. The bars 4 are provided with forward extensions 8 to form shafts so that the vehicle may be propelled by a horse or mule to and from the field.

A depending recessed bearing 9 is rigidly secured to the beam 1 at the middle point thereof and equidistant from the wheels 7 and is fitted with a caster wheel 10. Similar bearings 11 and caster-wheels 12 are provided at each end of the rear beam 1. The caster-wheels are so mounted that they travel in the same plane with the wheels 7. A pair of end upright bars 13 are secured to the rear beam 1, at right angles thereto, and also secured to said beam 1 in a like manner are a plurality of intermediate upright bars 14. A longitudinal member 15, parallel with the beam 1, is mounted on the ends of the upright bars 13, 14. Brace-pieces 15ª extend from the member 15 to the front beam 2. A backwardly-extending frame is pivotally connected to the vertical frame 1, 13, 14, 15. A plurality of cross-bars 16 of this frame are pivotally mounted at one end to the longitudinal member 15 and are rigidly secured near their outer ends to a longitudinal member 17 parallel to the member 15. The members 15, 16 and 17 are extended beyond the main frame of the vehicle and their outer ends upturned at right angles to receive the eyes of an awning adapted to cover the vehicle.

A pair of rods 18 are connected at one end to the member 17 adjacent to the outer cross bars 16 and their free ends are slidingly received by bores in threaded pins 20 mounted in the upright bars 13. The outer threaded portions of the pins 20 are engaged by thumb nuts 21 for the purpose of drawing up the pins 20 and rigidly clamping the rods 18 in adjusted position against the uprights 13, so that the awning-carrying frame 15, 16, 17 may be lowered to any angle desired to accord with the position of the sun.

A rod 22 extends across the vertical portion of the frame parallel with and above the beam 1. Between each two adjacent cross-bars 3, 4 are suspended cotton sacks 23 with their mouths supported in open position by the rod 22 and beam 1. The closed ends of the sacks are supported by the front beam 2. A plurality of seats 24 are conveniently mounted on the frame just behind each of the caster-wheels 10, 12.

I provide a removable awning 25 to fit over the vehicle. The awning 25 is provided near its outer edge with eyes adapted to fit over the upturned ends 26 of the extensions of the members 15, 16 and 17. The front edge of the awning 25 is equipped with straps 28 or the like to secure it firmly to the front beam 2.

The vehicle is adapted to straddle six rows of cotton and shelter seven pickers.

Each wheel 7, 10 and 12 runs between two rows of cotton and each sack 23 travels between two rows of cotton. A picker walks directly behind each of the outer two sacks 23 and each of the wheels 7, and each of the seats 24 accommodates a picker, making a total of seven pickers. The seven pickers pick seven rows of cotton, the six rows straddled by the vehicle and a half of each of the two outer rows adjacent to the vehicle on the sides thereof. The cotton is conveniently deposited in the sacks 23 and the awning is adjusted as desired as heretofore described.

By referring to Fig. 3 it will be understood that the wheels 7 and 12 travel in alternate furrows, and between the correlative wheels 7 and 12 at each side of the frame two rows are traversed. The wheel 10 travels between two rows, a row being between each wheel 7 and the wheel 10. The sacks are thus carried over the furrows between the wheels 7 and 12 and over the furrow in which the wheel 10 travels. The pickers seated are in position to easily reach the branches of the stalks either at the top or bottom of the stalks. The mouths of the sacks are not so high in the frame that they can not be easily reached by the walking pickers. It is to be noted that this vehicle is drawn through the cotton field at a very low rate of speed which does not exceed one half a mile an hour.

It is to be understood that I contemplate any variations in the particular construction described which are embraced by the scope of the appended claims.

Having described my invention what I claim, and desire to secure by Letters Patent, is:

1. In a cotton picker's vehicle, a horizontal frame, wheels disposed transversely of the frame and supporting the same, uprights carried by the frame, and a canopy frame mounted on the upper ends of the uprights and comprising a horizontal portion extending rearward from the uprights and an inclined portion extending downward from the uprights.

2. In a cotton picker's vehicle, a horizontal open frame, wheels supporting the frame, seats carried by the frame, uprights extending from the frame, a canopy frame comprising a rearwardly extending horizontal portion and a forwardly extending downwardly inclined portion, a fabric covering the canopy frame, and braces extending from the uprights to the horizontal portion of the canopy frame.

In testimony whereof I have signed my name to this specification in the presence of two subscribing witnesses.

WILLIAM L. THOMAS.

Witnesses:
J. S. MURRAY,
L. B. AVEILHÉ.

---

Copies of this patent may be obtained for five cents each, by addressing the "Commissioner of Patents, Washington, D. C."